INVENTOR.
John Z. DeLorean
BY
Robert L. Spencer
ATTORNEY

# United States Patent Office 3,382,852
Patented May 14, 1968

3,382,852
THERMOSTATICALLY CONTROLLED FAN
John Z. De Lorean, Birmingham, Mich., assignor to General Motors Corporation, Detroit, Mich, a corporation of Delaware
Filed Mar. 30, 1966, Ser. No. 538,725
2 Claims. (Cl. 123—44.12)

ABSTRACT OF THE DISCLOSURE

This invention relates to a fan and water pump drive for an engine wherein the water pump is continuously driven by the engine and the fan is intermittently driven at various speeds of rotation relative to water pump speed through a friction clutch wherein the water pump impeller includes one of the friction surfaces and wherein both friction surfaces are located in the pump discharge chamber for cooling of the surfaces when the surfaces are operated in friction slipping engagement. The arrangement is of simple economical construction, conserves space by disposing the clutch elements within the pump discharge chamber, and provides long useful life of the clutch surfaces, permitting friction slipping surface contact without burning of the surfaces. By placing the friction contact surface on the outer periphery of the impeller and on the axially movable clutch member outwardly of the impeller, maximum torque-transmitting capacity is obtained in minimum required space.

---

This invention relates to thermostatically controlled mechanism and more particularly to mechanisms for controlilng the cooling medium for an internal combustion engine and responsive to changes of temperature of the liquid engine coolant.

Internal combustion engines are normally cooled by two mediums, water pumped through the engine and air flow over the external portion of the engine, and driven by an air fan.

In starting a cold engine it is desirable that the engine be quickly brought to its normal operating temperature. Also, it is desirable that the engine fan be declutched and permitted to idle whenever liquid coolant is adequate to maintain normal engine operating temperature without fan action in order to reduce the engine power consumed in driving the fan and to reduce fan noise.

The specific improvement herein incorporates a cone clutch and temperature-responsive actuator disposed within a chamber containing engine coolant such as water and wherein the water pump impeller is provided with a conical surface forming one part of the clutch. The other clutch part is splined to the fan drive shaft. Since both conical clutch parts are disposed within a chamber containing engine coolant, this coolant prevents undue thermal stress in the clutch during intervals in which the clutch may be operating in friction slipping partial engagement. This greatly increases clutch life. A bimetallic disc controls fan clutch engagement and disengagement and may at times permit the fan to be driven at speeds less than water pump impeller speed through clutch slippage when full fan cooling is not required. The pump impeller is driven by means of a hollow sleeve shaft and the fan is driven by a shaft extending through the water pump impeller drive shaft. A fan hub bearing supports the fan hub for rotation upon the water pump impeller drive shaft and absorbs the reaction of the termostatic disc spring when the clutch is applied.

Figure 1:
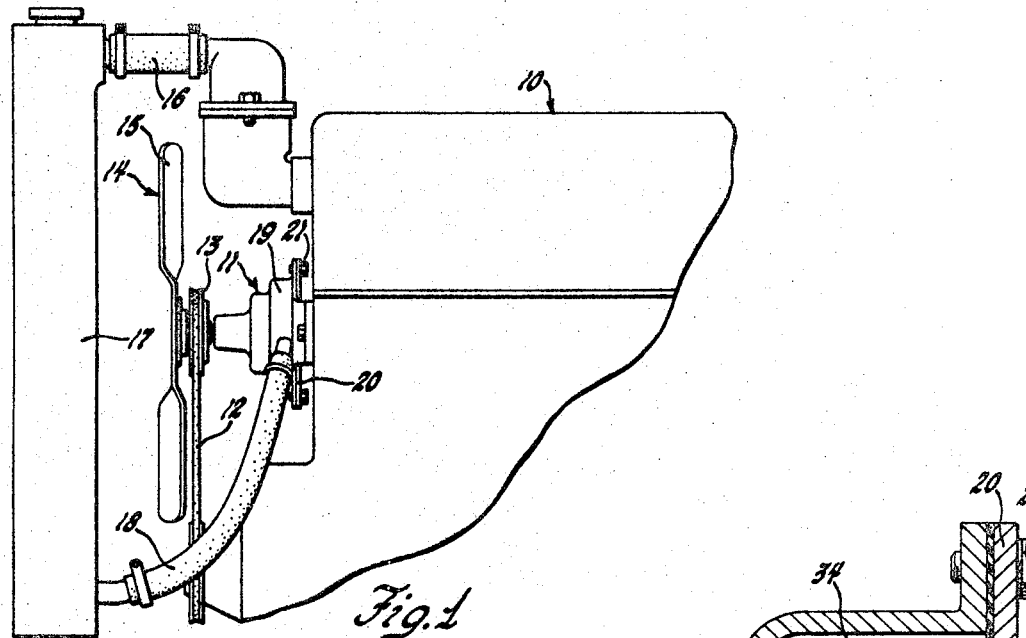

These and other features of this invention will be apparent from the following description and claims taken in conjunction with the accompaying drawings, in which:
FIGURE 1 is a fragmentary side elevation of an internal combustion engine having a fan and water pump drive of this invention attached thereto.

Figure 2:
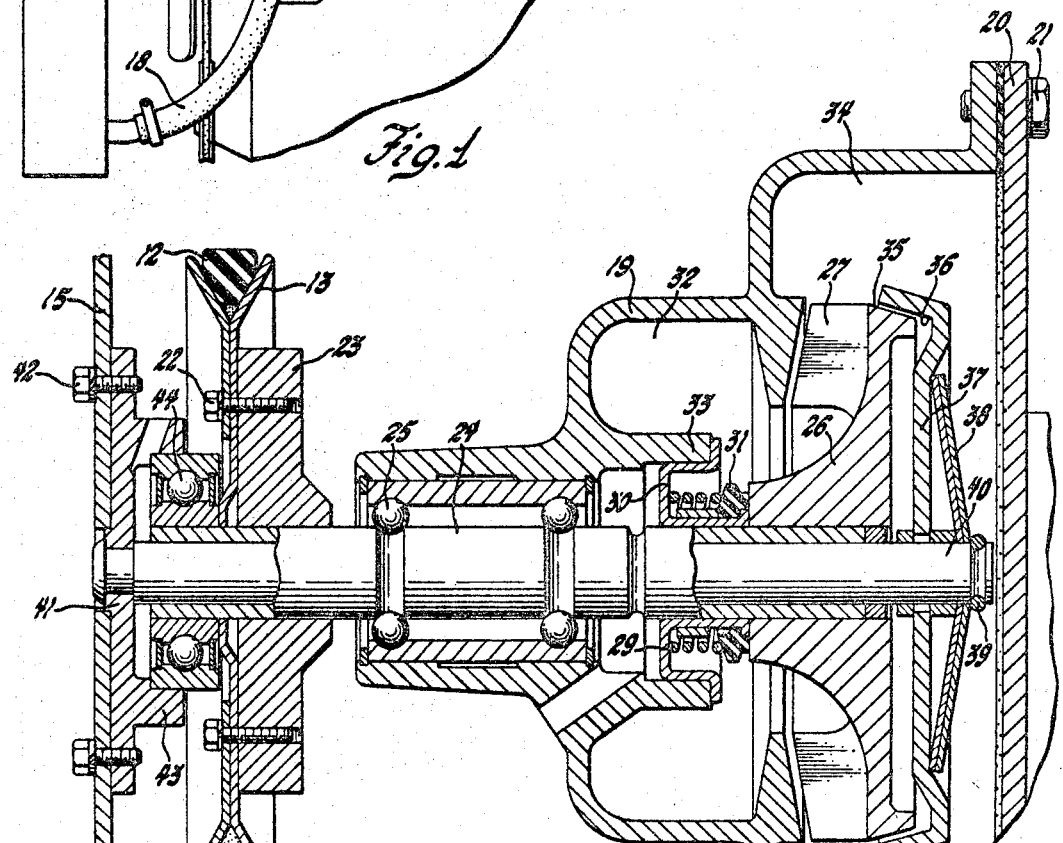

FIGURE 2 is an enlarged section through the improved mechanism illustrating the position of the parts with the fan drive clutch released.

Referring to the drawings and particularly to FIGURE 1, there is shown a portion of an internal combustion engine indicated generally at 10 having water jackets (not shown) through which liquid coolant such as water may be circulated by means of a pump indicated generally at 11. A belt 12 may drive a pulley 13 to drive the water pump. A fan 14 having blades 15 may be driven as hereafter explained. Water flows from engine 10 to a radiator 17 through a hose connection 16 and from radiator 17 back to pump 11 by means of hose 18 in the conventional manner. A pump housing 19 is secured to a support flange 20 by means of bolts 21.

Referring to FIGURE 2, pulley 13 is bolted to a pulley hub 23 by bolts 22 and drives a water pump impeller drive shaft 24 at all times when the engine is running. Shaft 24 is supported for rotation in pump housing 19 by means of a suitable bearing 25 and drives a pump impeller 26 having blades 27. A spring 29 seated upon a spring seat 30 biases a seal 31 into contact with one end of the base of impeller 26 to prevent leakage of coolant from pump suction chamber 32 along shaft 24. Spring seat 29 seats on an axially extending boss 33 formed on pump housing 19. Since all of the parts associated with seal 30 are disposed in the low pressure chanmber 32 there is little tendency for fluid to leak past the seal. Impeller blades 27 draw fluid from low pressure chamber 32 and discharge the fluid into pump pressure delivery chamber 34.

Impeller 26 is provided with a conical surface 35 adapted to be engaged by a conical surface 36 of a clutch member 37. Clutch member 37 is splined to a fan drive shaft 40 which in turn extends through and is rotatably supported in pump impeller drive shaft 24. A bimetallic spring 38 abuts a reaction member 39 on shaft 40 and contacts the surface of clutch member 37 on the side of the member opposite to conical surface 36. A fan hub 41 is secured to the opposite end of shaft from spring 38 and drives fan blades 15 which may be secured to hub 41 by bolts 42. A roller bearing 44 disposed between an axially extending boss 43 formed on fan hub 41 and water pump impeller shaft 24 supports hub 43 for rotation and absorbs the reaction of the thermostatic disc spring when the cone clutch is engaged.

In operation with a cool engine water pump impeller 26 will be engine driven and draw coolant from low pressure chamber 32 and deliver the same to high pressure chamber 34. As the engine coolant temperature rises, bimetallic washer spring 38, disposed in the coolant in chamber 34 will also rise in temperature and bias clutch member 37 toward its clutch engaged position wherein cone surface 36 contacts cone surface 35 on impeller 26. With the clutch fully engaged, fan blades 15 will be driven through pump impeller 26 at the speed of rotation of impeller 26. At times, due to the fan load on shaft 40 tending to resist rotation of the shaft, the temperature response of spring 38 may be such that cone surfaces are maintained in contact in friction slipping engagement such that shaft 40 is driven at a speed less than that of shaft 24 and impeller 26. However, since the cone surfaces 35 and 36 are disposed in the engine coolant in chamber 34, the clutch is not subjected to thermal distress while slipping. It will readily be understood that disc spring 38 applies an axial thrust on clutch member 37 which increases with increase in engine coolant temperature and that this spring load decreases with decrease in coolant temperature to allow the fan to idle when air propulsion is not required.

What is claimed is:

1. In combination, a coolant circulating pump for circulating liquid engine coolant for an engine and a fan drive structure, a pump housing forming a chamber, a hollow pump drive shaft rotatably supported in said housing and extending into said chamber, a pump impeller driven by said pump drive shaft disposed within said housing and coacting with said housing to divide said chamber into suction and pressure discharge chambers, means exterior of said housing connecting said pump drive shaft to said engine for continuously driving said pump drive shaft when said engine is operating, a fan drive shaft supported within said hollow pump drive shaft, a fan on said fan drive shaft adapted to be driven by said fan drive shaft, a friction surface on said pump impeller and located in said pump discharge chamber, an axially movable clutch member carried by said fan drive shaft and located in said pump discharge chamber, a friction surface on said clutch member adapted to contact said pump impeller friction surface to transmit torque from said pump impeller to said fan drive shaft, a temperature responsive member carried by said fan drive shaft and located in said pump discharge chamber for urging said friction surface of said clutch member into contact with said pump impeller friction surface upon rise of temperature of coolant in said pump discharge chamber, the coolant in said pump discharge chamber cooling said friction surfaces when said friction surfaces are disposed in friction slipping engagement by said temperature responsive member.

2. A fan and water pump drive as set forth in claim 1 wherein the friction surface on said pump impeller comprises a conical friction surface on the outer periphery of said impeller on the side of said impeller opposite said suction chamber and said axially movable clutch member includes a conical friction surface radially outwardly of said pump impeller friction surface.

References Cited
UNITED STATES PATENTS

| | | |
|---|---|---|
| 2,090,401 | 8/1937 | Mayo. |
| 2,838,244 | 6/1958 | Oldberg _____ 123—41.11 X |
| 2,855,909 | 10/1958 | Stefan _____ 123—41.12 |
| 2,877,751 | 3/1959 | Johnston _____ 123—41.12 |
| 2,957,459 | 10/1960 | Tauschek _____ 123—41.12 |

AL LAWRENCE SMITH *Primary Examiner.*